(12) United States Patent
Mzhavanadze

(10) Patent No.: US 12,457,944 B2
(45) Date of Patent: Nov. 4, 2025

(54) TRANSFORMABLE GREENHOUSE SYSTEM

(71) Applicant: Tornike Mzhavanadze, Tbilisi (GE)

(72) Inventor: Tornike Mzhavanadze, Tbilisi (GE)

( * ) Notice: Subject to any disclaimer, the term of this patent is extended or adjusted under 35 U.S.C. 154(b) by 0 days.

(21) Appl. No.: 18/707,221

(22) PCT Filed: Mar. 1, 2023

(86) PCT No.: PCT/GE2023/050002
§ 371 (c)(1),
(2) Date: May 3, 2024

(87) PCT Pub. No.: WO2023/194755
PCT Pub. Date: Oct. 12, 2023

(65) Prior Publication Data
US 2025/0008882 A1 Jan. 9, 2025

(30) Foreign Application Priority Data

Apr. 4, 2022 (GE) .............................. AP 2022 15922

(51) Int. Cl.
*A01G 9/02* (2018.01)
*A01G 31/04* (2006.01)

(52) U.S. Cl.
CPC .............. *A01G 9/023* (2013.01); *A01G 9/025* (2013.01); *A01G 31/047* (2013.01)

(58) Field of Classification Search
CPC ...... A01G 31/02; A01G 31/06; A01G 31/047; A01G 31/042; A01G 9/023; A01G 9/024; A01G 9/143

USPC .............................. 108/96; 211/113; 254/387
See application file for complete search history.

(56) References Cited

FOREIGN PATENT DOCUMENTS

| CN | 109121836 A | * | 1/2019 | |
|---|---|---|---|---|
| CN | 210840830 U | * | 6/2020 | |
| CN | 212436546 U | * | 2/2021 | |
| CN | 112773151 A | * | 5/2021 | ............... A47F 7/19 |
| CN | 112997729 A | * | 6/2021 | ............ A01G 27/005 |
| CN | 114223428 A | * | 3/2022 | |
| CN | 115176626 A | * | 10/2022 | ............. A01G 9/025 |
| JP | S6355843 U | * | 4/1988 | |
| JP | 2004254688 A | * | 9/2004 | |
| WO | WO-2020237297 A1 | * | 12/2020 | ............. A01G 31/06 |

* cited by examiner

*Primary Examiner* — Joshua D Huson
*Assistant Examiner* — Brook Victoria Schmid
(74) *Attorney, Agent, or Firm* — Nadya Reingand

(57) ABSTRACT

A transformable greenhouse system comprises devices for growing plants arranged in rows (2), where each of the devices includes vertical bearing posts (3) to which horizontal beams (5) are hinged, on which the vegetation receptacles of plants (10) are hung. The horizontal beams have the ability to turn and move in the vertical plane by way of a drive. In addition, the mentioned beams have the capability of being fixed in the vertical plane to place the vegetation receptacles of plants at different heights. The vegetation receptacles of plants are located on horizontal beams with the capability of adjusting the distance between them.

3 Claims, 6 Drawing Sheets

TRANSFORMABLE GREENHOUSE SYSTEM

RELATED APPLICATIONS

The current patent application is the National stage application from the PCT application No. PCT/GE2023/050002 filed on Mar. 31, 2023, which claims priority to the Georgian application AP202215922 filed Apr. 4, 2022, all of which are incorporated herein in their entirety.

FIELD OF THE INVENTION

The invention relates to agriculture, in particular to devices for growing plants in an artificial environment.

BACKGROUND OF THE INVENTION

A variety of vegetation systems of plants on protected soil are known. The ultimate goal of the mentioned technical solutions is the maximum utilization of the useful area of a greenhouse, for which various technical constructions and methodical solutions are used. Some of them can be used for operation under natural lighting conditions, and some for operation under artificial lighting conditions. For such optimization conditions, one of the challenges remains to be taking into account the moving spaces for services, which is why many technical solutions are being developed, which, on the one hand, should take into account the provision of the maximum area for planting plants and, at the same time, the presence of wide passageways for services, including technical means: capability to move carts, small tractors or other technical means.

The closest technical solution to the present invention is a rotor-planetary type device intended for growing plants, which contains a number of soil containing capacities, which are located on tensioners between the stands of the device, the stands being mounted on a central axis with the capability of rotating about it. In addition, the capacities also rotate about their hanger axes and along concentric circles around the central axis. The central axis is located between two side walls placed on a movable platform. The platform is provided with wheels that are made with the capability of moving on a pair of rails that are mounted on the surface of the device/RU 173220 U1, 16.08.2017/.

The drawback of the known device is that it is characterized by the complexity of construction and operating conditions, and the efficiency of growing plants using this device is low. Although the system comprising the mentioned devices allows the rotation of the rows, it requires a massive structure, installation of pairs of rails to move the platform, which is associated with difficulty and at the same time, the system containing such devices intended for growing plants located in the greenhouse is very limited by the longitudinal dimensions of the rows, so that the vegetative capacities of the plants are not affected by the force of gravity. In long greenhouses, it will be necessary to make many such heavy structures, or it will create the need to add many intermediate supports, which will make the structure even heavier and make it inflexible to move the platform on the rails. In addition, the distance between the vegetation capacities of the plants is fixed and due to the size of a cultivated crop, it does not allow to optimize the distances between the rows. During the cultivation of small plants, it would also be possible to insert additional rows, and vice versa, if at the next stage it is necessary to grow larger crops, it would be possible to remove the vegetation rows and optimize the whole system.

SUMMARY OF THE INVENTION

The objective of the present invention is to eliminate the above-mentioned shortcomings and make it possible to fully utilize the useful area of a greenhouse and provide the best environment of natural lighting throughout the entire area of vegetation throughout the day.

The technical effect of the invention is increased productivity of the plant growing process by maximizing the use of a greenhouse area and also by reducing the labor costs for the greenhouse service.

The essence of the invention is that the transformable greenhouse system comprises devices for growing plants arranged in rows, wherein the said device comprises vertical bearing posts, to which horizontal beams, on which the vegetation receptacles of the plants are hung, are hinged. Horizontal beams have the capability of turning and moving in the vertical plane by means of a drive. In addition, the mentioned beams also have the capability of fixing in the vertical plane to place the plants at different heights of the vegetation receptacles. In addition, the vegetation receptacles of the plants are located on horizontal beams with the capability of adjusting the distance between them.

In the preferred embodiment of the invention, a plurality of fastening holes for the vegetation receptacles of the plants are made on the horizontal beams of the device for growing plants. Vegetation receptacles for plants are made in the form of a continuous profile along the entire length of the device for growing plants. The drive is made in the form of winch connected to an electric motor and ropes, one end of which is connected to the winch, and the other end-through the rollers to the horizontal beams of the device for growing plants.

Features of the transformable greenhouse system set out in the invention summary are essential and provide the possibility of achieving the technical effect, in particular, in the system according to the present invention, the implementation of the device intended for growing plants in the form of horizontal beams hinged to vertical bearing posts, on which the vegetation receptacles of plants are hung, where horizontal beams are mounted on vertical bearing posts with the capability of turning and moving and fixing in the vertical plane, allows for greater dynamism and transformability of the system, in which the distance and quantity between the vegetation receptacles of the plants are adjustable. Moreover, when transforming the system according to the present invention, wide passageways are created for service, i.e. for moving technical means: carts, small tractors or other technical means. In all specific cases, depending on the geometric dimensions of the plant crop, the optimal distance between the vegetation receptacles of the plants is selected and the system is rearranged accordingly, which ultimately allows the use of the greenhouse space to a maximum extent, and placing the vegetation receptacles of the plants at a height convenient for the greenhouse service personnel leads to the reduction of the labor costs of the greenhouse service and the increase of the efficiency of growing plants.

BRIEF DESCRIPTION OF DRAWINGS

The description of the invention is explained by the drawings, where.

DETAILED DESCRIPTION OF THE INVENTION

Figure 1:
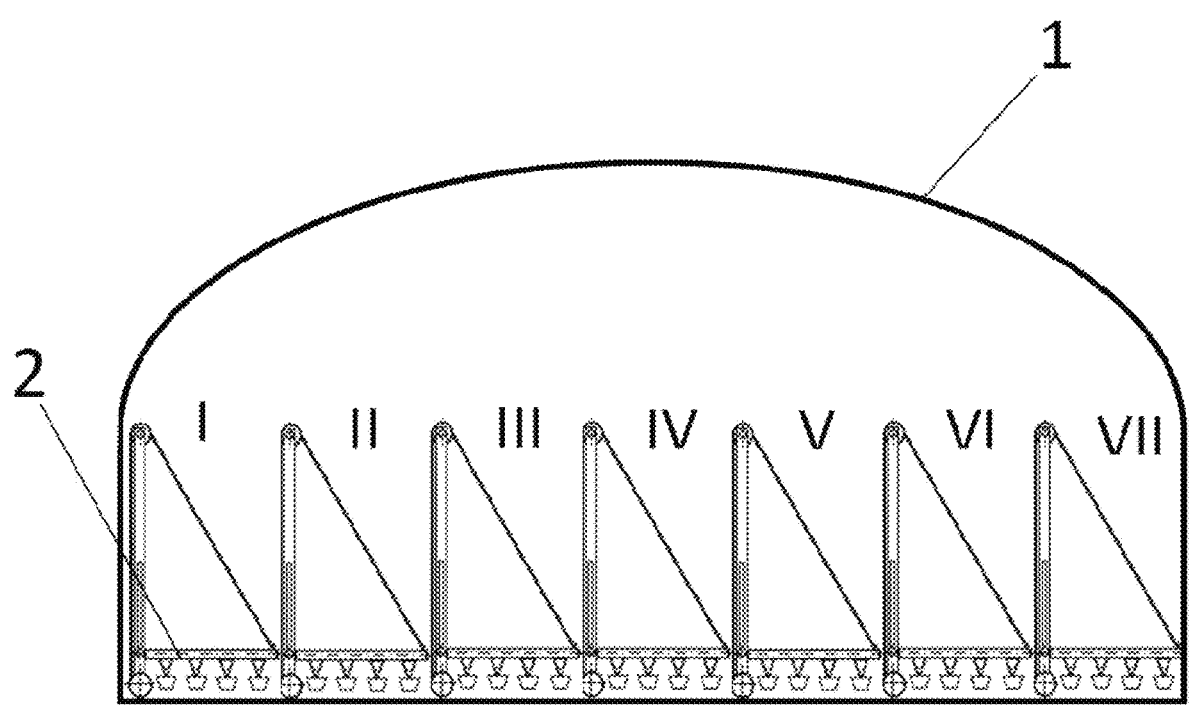
FIG. 1 shows a transformable greenhouse system, a general view.
Figure 2:
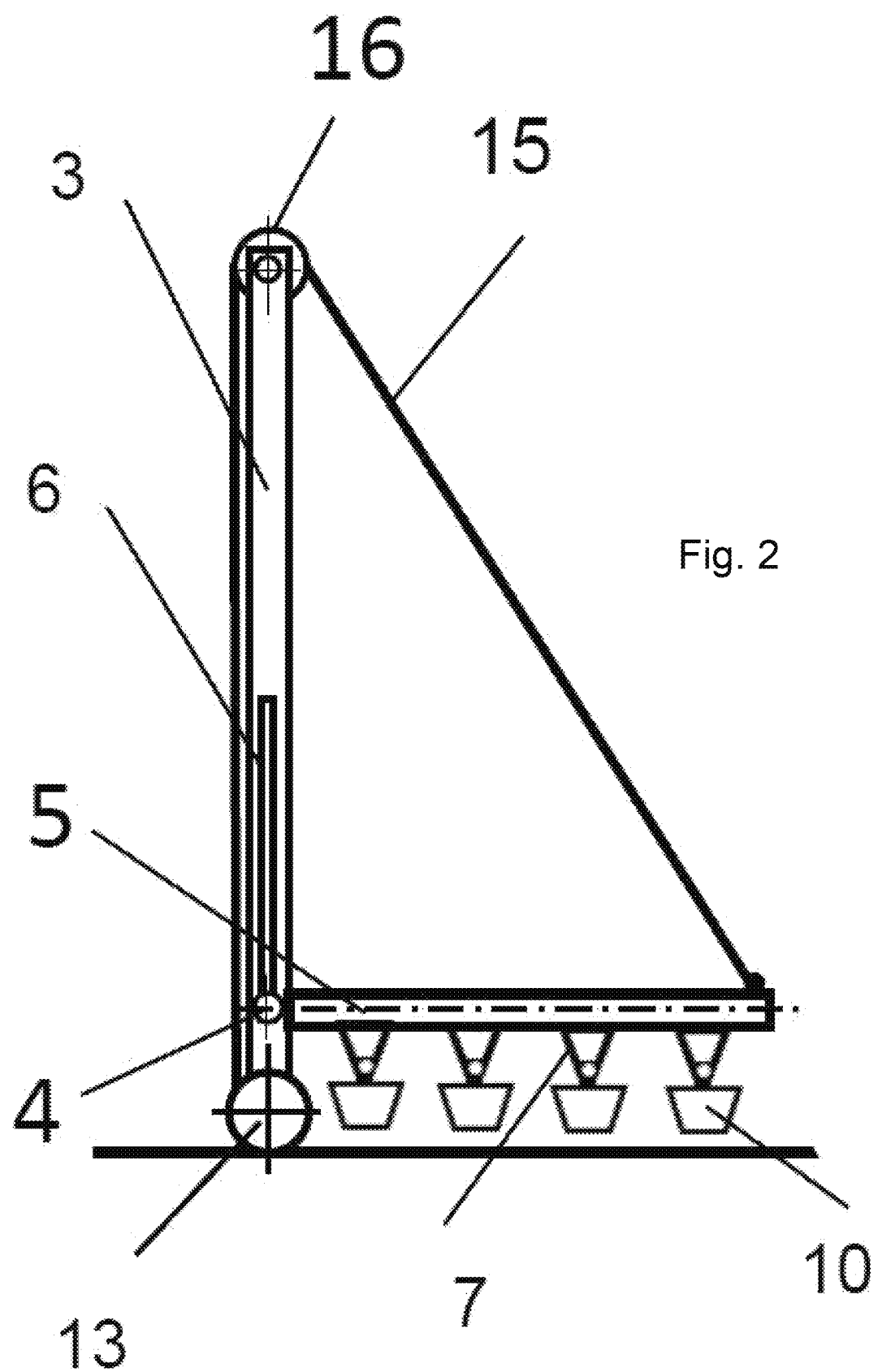
FIG. 2—device for growing plants, lateral view.
Figure 3:
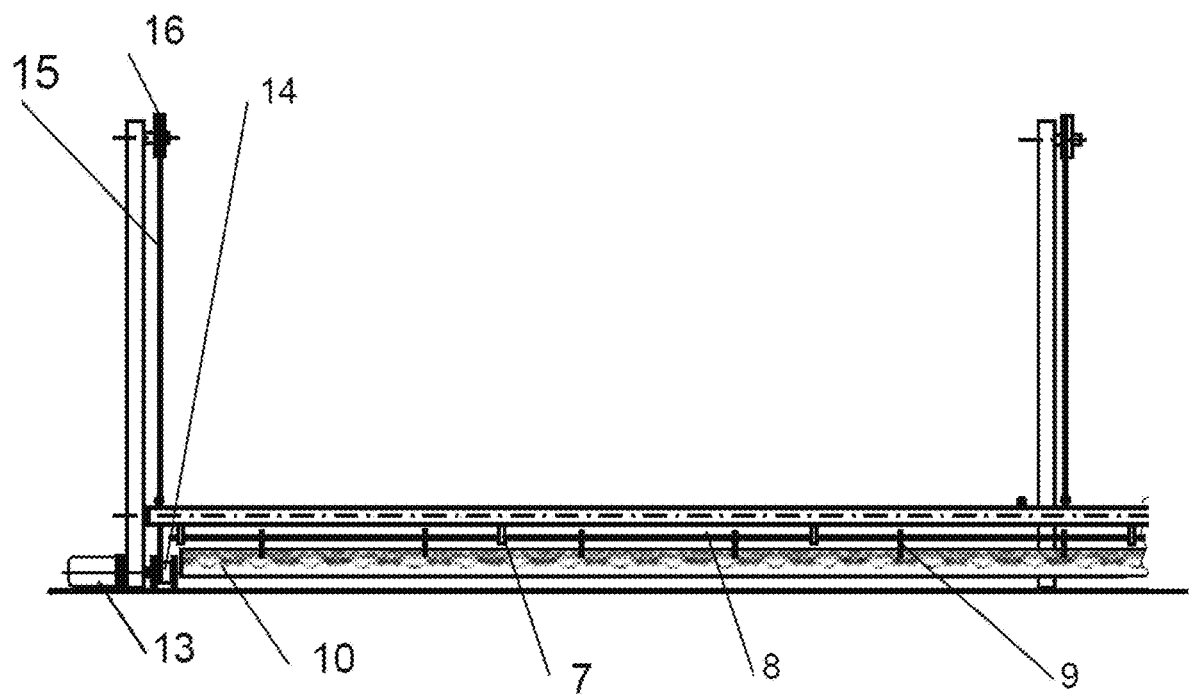
FIG. 3—front view of the same.
Figure 4:
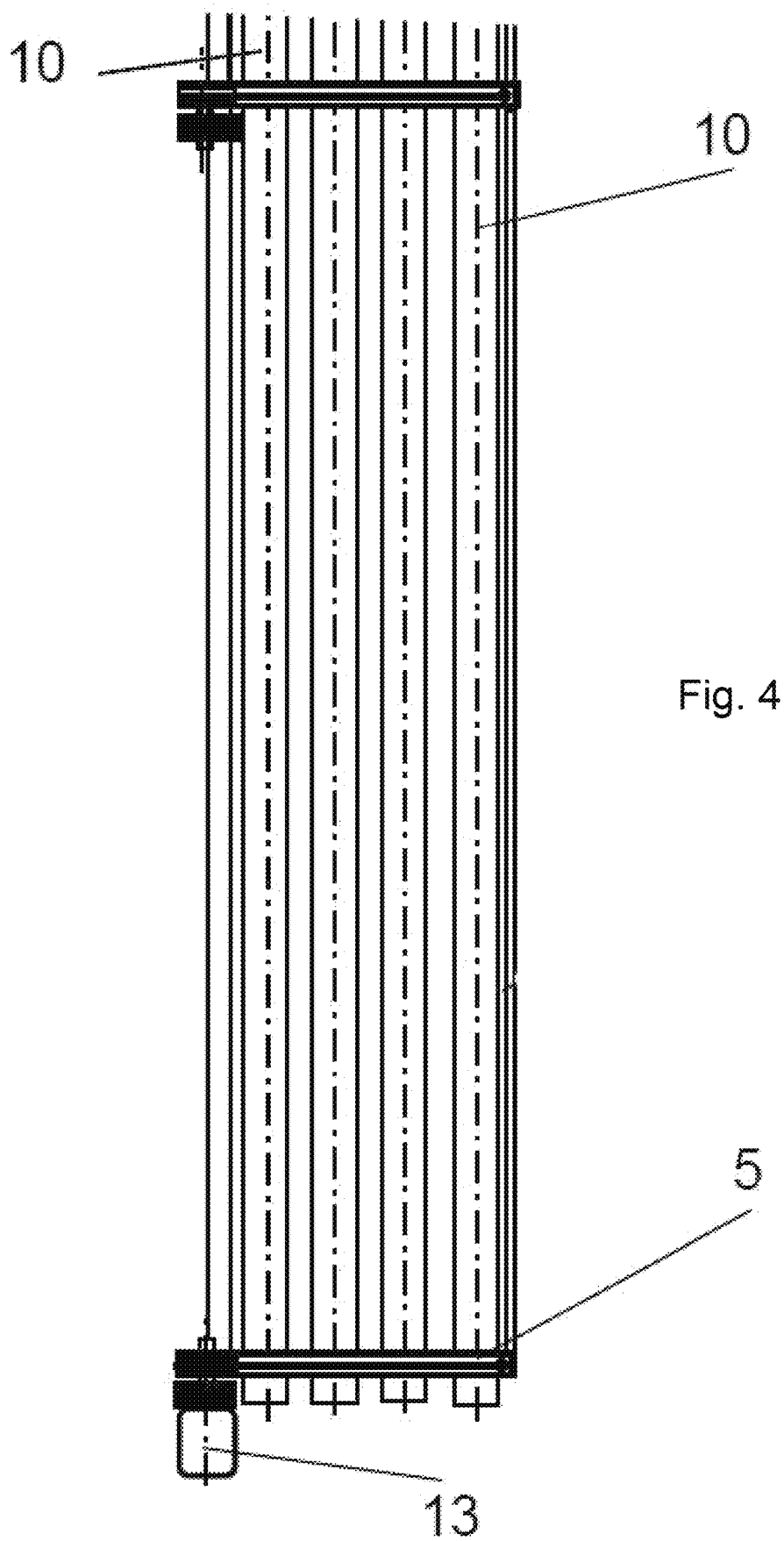
FIG. 4—top view of the same.

The transformable greenhouse system (see FIGS. 1-6) comprises devices 2 for growing plants that are arranged in rows I-VII in the greenhouse 1, for example, in seven rows. In each row I-VII, devices 2 for growing plants included in the system are placed longitudinally, and their number depends on the geometric dimensions of the greenhouse 1. The device 2 for growing plants included in the greenhouse system comprises vertical bearing posts 3, to which horizontal beams 5 are hinged by means of an axis 4. Vertical through grooves 6 are made on the bearing posts 3, through which the above-mentioned axis 4 passes. The horizontal beams 5 are installed in such a way that they have the capability of turning from the horizontal position to the vertical position about the axis 4 and of moving in the vertical plane through the vertical through grooves 6. In addition, the location of the above-mentioned beams 5 is fixed using fixing means (not shown in the drawings) known from the given art. Brackets 7 are attached to horizontal beams 5, with axes 8 passing therethrough. Along the entire length of the axis 8, by means of the hangers 9, the vegetation receptacles 10 of the plants are suspended such that the plants planted therein always maintain their vertical position under the influence of gravity. Plant vegetation receptacles 10 are arranged on horizontal beams 5 with the possibility of adjusting the distance between them, for which a plurality of plant vegetation receptacles 10 fastening holes 11 are made on the aforementioned beams 5, wherein the brackets 7 are fixed by means of fasteners 12. In a preferred embodiment of the present invention, the plant vegetation receptacles 10 are made in the form of a continuous profile along the entire length of the device 2 for growing plants. In each device 2 for growing plants, turning of horizontal beams 5 and movement in the vertical plane are carried out by a drive, made in the form of a winch 14 and ropes 15 connected to an electric motor 13, one end of which is connected to the winch 14, and the other end is connected to the horizontal beams 5 through the rollers 16. Instead of ropes, it is possible to use a belt, chain or other type of lifting means in the greenhouse system.

The transformable greenhouse system according to the present invention can be used in such systems where processes such as hydroponics, aquaponics and aeroponics are used for growing. All types of irrigation and drainage systems known in the art are compatible with this system.

The transformable greenhouse system works as follows: plant vegetation receptacles 10 of the system that are placed in each row (see FIG. 6) are fixed by means of brackets 7 at selected L distances, which depends on the dimensions of the vegetative plant. The mentioned distance L determines the possible number of placement of vegetation receptacles 10 of plants on horizontal beams 5 arranged in one plane. For example, if the maximum number of vegetation receptacles 10 for growing strawberries in one row of the system would be four, in the case of lettuce crop, five or six vegetable receptacles 10 would have been placed on it, because the required distance L between said receptacles 10 is much smaller in the case of strawberries, which will allow the farmer to hang on the system one or two additional vegetation receptacles 10. Such dynamism makes it possible to transform the system for all crops in order to get the maximum utilization Of the limited space regardless of the variety of vegetable crops. Plants to be grown are planted in the vegetation receptacles 10, which are located at the lower end point, on the horizontal beams 5 of the greenhouse system. When the maximum area of greenhouse 1 is utilized, natural and uniform lighting conditions are provided for a vegetable crop in one plane. It is necessary to provide wide passageways for providing services, picking crops and taking them out of the territory, for personnel, for moving various technical means between rows 1 I-VII of the greenhouse. This function is performed as follows: electric motor 13 of devices 2 for growing plants arranged in the rows of the system are turned on, and, thereby, the ropes 15 are set in motion, one end of which is mounted on the horizontal beams 5, and the other ends are mounted on the winch 14 through the rollers 16. As a result, the ends of the above-mentioned beams 5 on the rope 14 are pulled up and the beams 5 together with the vegetation receptacles 10 hanging on it begin to rotate around the common axis 4 and the system moves to a vertical position as shown in rows II and VII (see FIG. 5) and passageways are opened for staff to provide service in all vegetation rows. In order to ensure the working conditions of the service staff at a comfortable height from their position, the possibility of synchronously raising and lowering the plants to the desired height is provided. This function is performed when the system is moved from a horizontal position, for example, in row I (see FIG. 5) to a vertical position, as shown in rows II and VII, as the electric motor 13 continues to rotate in the same direction, the system's vegetation receptacles 10 will synchronously begin to move upwards to the desired height, as shown in rows III, IV and VI (see FIG. 5). In the vertically raised position, for example, in the case of rows III, IV, VII, the vegetation receptacles 10 remain outside the vertical bearing posts 3, In addition, through the hangers 9, the vegetation receptacles 10, under the influence of the force of gravity, always keep the plant seedlings in a vertical position. By turning on the electric motor 13 in reverse, the vegetation receptacles 10 are synchronously lowered to the end point, after which the said receptacles 10 will begin to turn from the vertical position to the horizontal position to the initial position.

Figure 5:
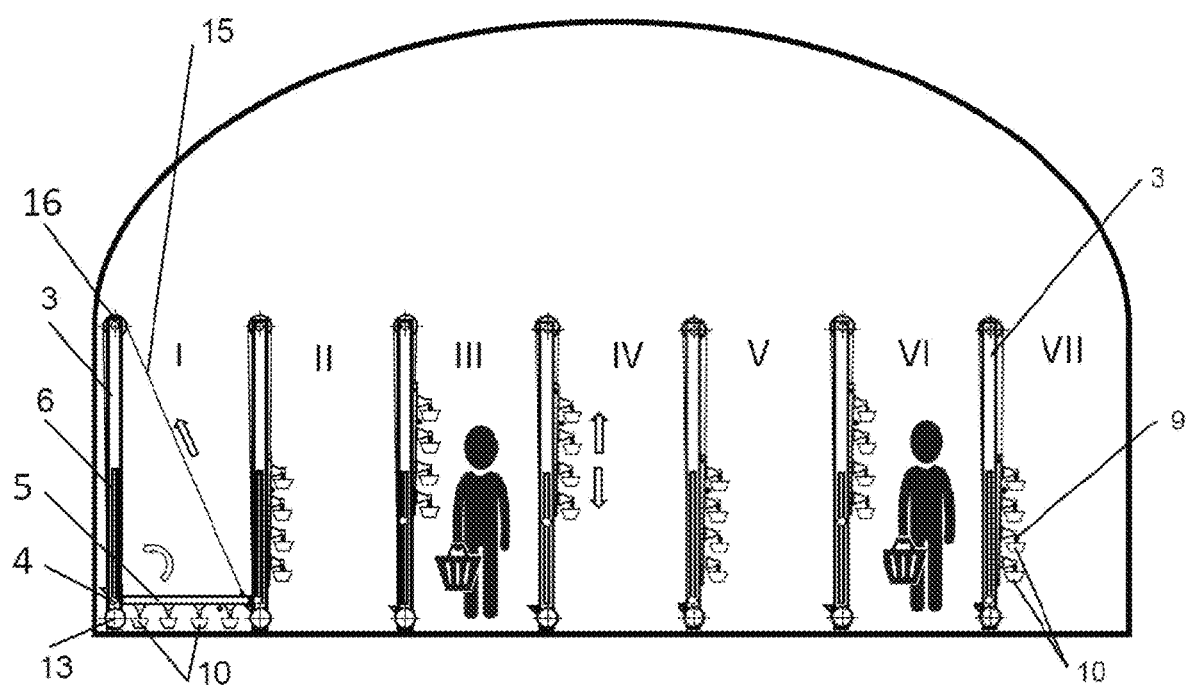
FIG. 5—the transformable greenhouse system in different locations of the vegetation receptacles of plants.
Figure 6:
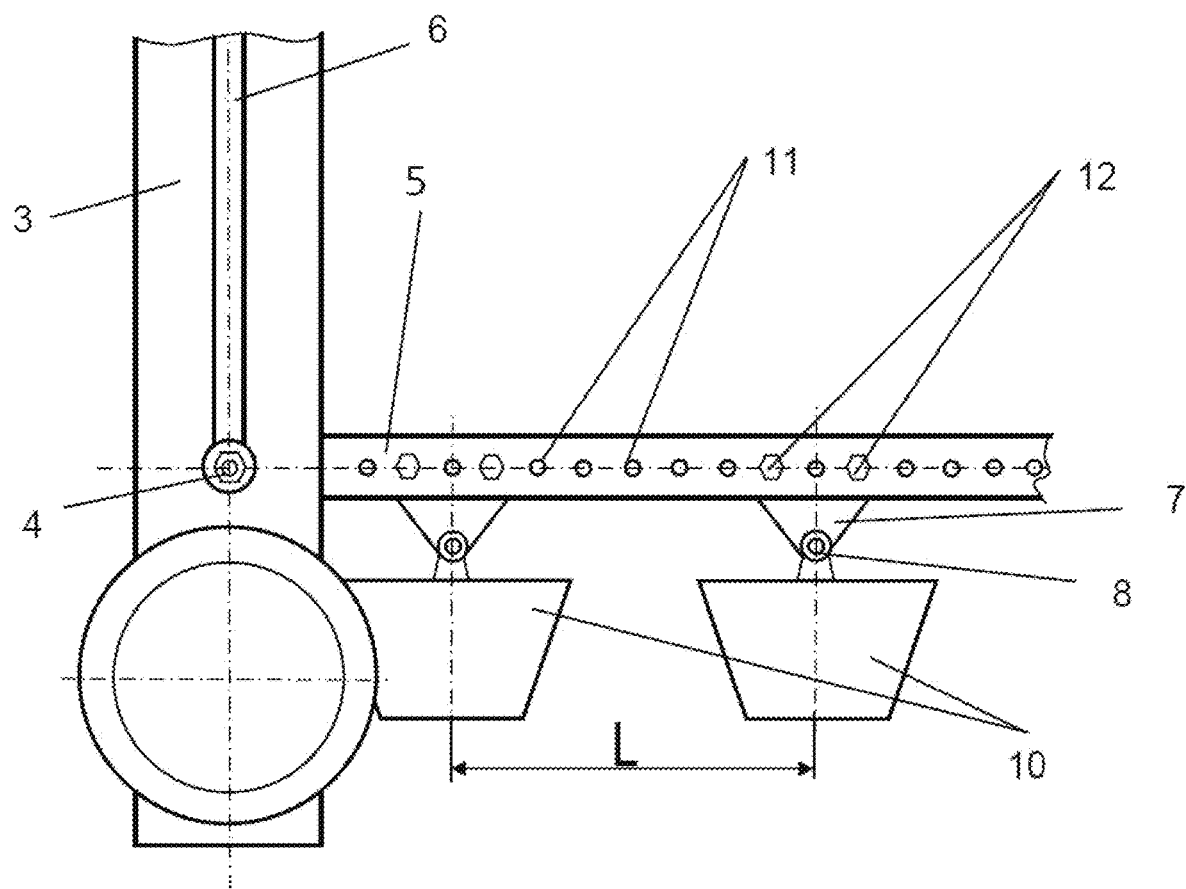
FIG. 6—hanging of the vegetation receptacles of plants on a horizontal beam.

The system has the ability to fix the vegetation receptacles 10 at different desired heights of the vertical bearing posts 3 by limiting the landing height of the beams 5 through the vertical receptacles 6 by means of any fixing means (not shown in the figures), which will limit the lowering of beams 5 to the desired height, for example, as shown in row V (see FIG. 5).

The transformable greenhouse system according to the present invention provides the possibility of plant growth on protected soil under natural lighting conditions, using soil as well as hydroponics, substrates, aquaponics, and other plant growth methods and processes. It provides the opportunity to optimally adjust the distance between the vegetation receptacles in accordance with plant sizes and vegetation conditions, and at the same time provides the best conditions of perfect service for the staff during the entire vegetation cycle, Moreover, when transforming the system in order to harvest and take it out of the territory, wide passageways are created for services, for moving technical means: carts, small tractors or other technical means.

As a result, using the proposed greenhouse system, the productivity of the plant growing process is increased by maximizing the use of the greenhouse area and also by reducing the labor costs of the greenhouse service.

The invention claimed is:

1. A transformable greenhouse system, comprising:
   plant-growing devices arranged in rows;
   wherein each of the plant-growing devices comprises:
   vertical bearing posts each having a vertical through groove;
   horizontal beams hingedly connected to the vertical bearing posts;
   vegetation receptacles hanging on the horizontal beams; and
   a drive configured to turn the horizontal beams from a horizontal position to a vertical position and move the horizontal beams along the vertical through grooves;
   wherein the vegetation receptacles are arranged on the horizontal beams with an adjustable distance therebetween such that the vegetation receptacles remain outside the vertical bearing posts at different heights when the horizontal beams are in the vertical position; and
   wherein the vegetation receptacles have a continuous profile along an entire length of each of the plant-growing devices.

2. The transformable greenhouse system according to claim 1, wherein the horizontal beams of each of the plant-growing devices comprise a plurality of holes for fixing the vegetation receptacles.

3. The transformable greenhouse system according to claim 1, wherein the drive comprises a winch and ropes connected to an electric motor, one end of the ropes being connected to the winch, and another end of the ropes being connected through rollers to the horizontal beams of the plant-growing devices.

* * * * *